United States Patent
Kim et al.

(10) Patent No.: US 8,600,214 B2
(45) Date of Patent: Dec. 3, 2013

(54) PORTABLE TERMINAL AND METHOD FOR MANAGING VIDEOS THEREIN

(75) Inventors: Han Sang Kim, Suwon-si (KR); Kwang Pyu Ghoi, Anyang-si (KR); Young Hun Joo, Yongin-si (KR); Gorodetskii Denis, Suwon-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1289 days.

(21) Appl. No.: 12/174,684

(22) Filed: Jul. 17, 2008

(65) Prior Publication Data

US 2009/0110363 A1  Apr. 30, 2009

(30) Foreign Application Priority Data

Oct. 29, 2007 (KR) .......................... 10-2007-0108691

(51) Int. Cl.
*H04N 5/91* (2006.01)
(52) U.S. Cl.
USPC ............................ 386/241; 386/353; 386/362
(58) Field of Classification Search
USPC .......... 709/211, 212, 216, 217, 229; 707/600, 707/607, 608, 609, 687, 3; 386/52, 124, 386/126, 95, 96; 725/37
See application file for complete search history.

(56) References Cited

U.S. PATENT DOCUMENTS

| 6,453,471 | B1 | 9/2002 | Klosterman | 725/41 |
| 2006/0253436 | A1* | 11/2006 | Cook et al. | 707/3 |
| 2008/0066102 | A1* | 3/2008 | Abraham et al. | 725/37 |

FOREIGN PATENT DOCUMENTS

| JP | 2005-286671 | 10/2005 |
| KR | 2005-89603 | 9/2005 |
| WO | WO 00/45593 | 8/2000 |

* cited by examiner

*Primary Examiner* — Jeffrey Pwu
*Assistant Examiner* — Nega Woldemariam
(74) *Attorney, Agent, or Firm* — Cha & Reiter, LLC

(57) ABSTRACT

A portable terminal and a method for managing videos in the portable terminal are provide increased efficiency in managing videos in the portable terminal. The portable terminal includes: a memory for storing at least one video and a preview thereof, a controller for playing back a preview of a video corresponding to a set preview section during a video search and, upon selection of a video, playing back the selected video; and a display unit for displaying, under control of the controller, the video preview and the video that are being played back. The method for managing videos in the portable terminal includes: displaying a list of at least one video preview on a first screen during a video search; playing back, on a second screen, a preview of a video corresponding to a set preview section; selecting the video corresponding to the video preview being played back; and playing back the selected video.

20 Claims, 4 Drawing Sheets

PORTABLE TERMINAL AND METHOD FOR MANAGING VIDEOS THEREIN

CLAIM OF PRIORITY

This application claims priority to an application entitled "PORTABLE TERMINAL AND METHOD FOR MANAGING VIDEOS THEREIN" filed in the Korean Intellectual Property Office on Oct. 29, 2007 and assigned Serial No. 2007-0108691, the contents of which are incorporated herein by reference in its entirety.

BACKGROUND OF THE INVENTION

1. Field of the Invention

The present invention relates to a portable terminal and a method for performing supplementary functions. More particularly, the present invention relates to a portable terminal capable of storing at least one video and a method for managing videos therein.

2. Description of the Related Art

Recently, as portable terminals have developed into multimedia devices offering a wide variety of services by incorporating various functions, their capabilities have advanced to the point of being able to store vast amounts of user data such as text, still images, video, and music, just to name a few items.

When a user searches for a desired video on a portable terminal, the portable terminal displays only a thumbnail image for the video that is typically created from a first frame of the video. Upon selection of a thumbnail image by the user, the portable terminal plays back the video.

However, it is inconvenient for a user of a portable terminal to search for a desired video by using only a thumbnail image for the video. First, when there are many videos to select from, a thumbnail may not adequately identify the video or permit a quick and easy identification. Furthermore, the user has to manually select a thumbnail image corresponding to a video to be played back, so as to find their desired video. This may decrease the efficiency in managing videos in a portable terminal.

SUMMARY OF THE INVENTION

The present invention provides a portable terminal and a method for managing videos in the portable terminal that permits improved efficiency in managing videos.

In an exemplary embodiment of the present invention, a method for managing videos in a portable terminal typically includes: playing back a preview of a video corresponding to a set preview section during a video search; and selecting a video; and playing back the selected video.

In another exemplary embodiment of the present invention, a method for managing videos typically includes: displaying a list of at least one video preview on a first screen during a video search; playing back, on a second screen, a preview of a video corresponding to a set preview section; selecting the video corresponding to the video preview being played back; and playing back the selected video.

In yet another exemplary embodiment of the present invention, a portable terminal for performing a function of managing videos typically includes: a memory for storing at least one video; a controller for playing back a preview of a video corresponding to a set preview section during a video search and, upon selection of a video, playing back the selected video; and a display unit for displaying, under control of the controller, the video preview and the video that are being played back.

The present invention enables playback of a preview of a video corresponding to a set preview section during a video search on a portable terminal. Viewing a video preview instead of the entire video enables a user of a portable terminal to easily search for a desired video as opposed to, for example, a mere thumbnail. The present invention also eliminates the need for a user to manually select and view videos in order to search for a video that they want to view, thereby increasing the efficiency of managing videos in the portable terminal.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
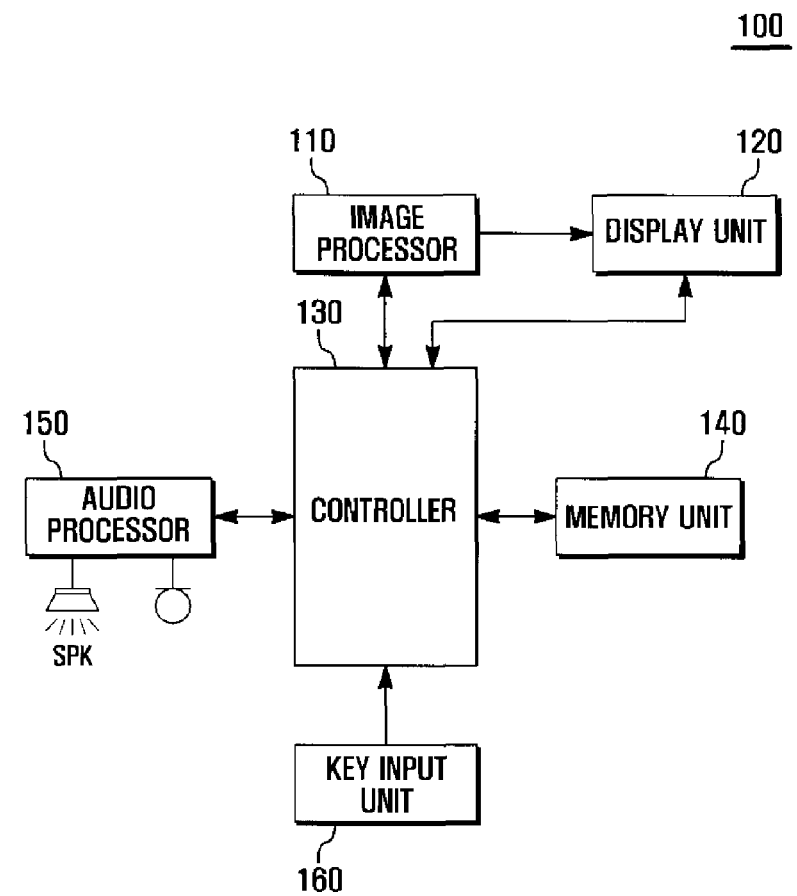
FIG. 1 is a block diagram illustrating a configuration of a portable terminal according to an exemplary embodiment of the present invention.

Hereinafter, exemplary embodiments of the present invention for managing videos are described in detail with reference to the accompanying drawings. The examples provided herein are for illustrative purposes only, and the claimed invention is in no way limited to the examples described and shown herein. The same reference symbols identify the same or corresponding elements in the drawings. Some constructions or processes known in the art are not described to avoid obscuring appreciation of the invention by a person of ordinary skill in the art with unnecessary detail.

In the exemplary embodiments described, a "video" typically refers to a group of moving pictures combined and stored in a preset sequence and a "video preview" refers to a miniaturized image corresponding to a section of a video to be played back on a portable terminal. That is, during a video search, the portable terminal may display a list of video previews or may display a list of thumbnail images that are created from first frames of the video previews. The portable terminal may also display a video preview corresponding to one of the thumbnail images. A "preview section" typically refers to a section of a video that is displayed on a portable terminal using a video preview. The preview section may be individually set for each video stored in the portable terminal.

FIG. 1 is a block diagram illustrating a configuration of a portable terminal 100 for managing a video according to an exemplary embodiment of the present invention.

Referring to FIG. 1, the portable terminal 100 typically includes an image processor 110, a display unit 120, a controller 130, a memory unit 140, an audio processor 150, and a key input unit 160.

The image processor 110 generates screen data for displaying an image signal. More specifically, the image processor 110 processes an image signal on a frame-by-frame basis and outputs frame image data to match the display characteristics and size of the display unit 120. The image processor 110 also includes an image coder/decoder (codec) to compress the frame image data to be displayed on the display unit 120 using a predetermined compression technique and to decompress compressed frame image data into original frame image data. The image codec may comprise, for example, a Joint Photographic Experts Group (JPEG), Moving Pictures Experts Group-4 (MPEG-4), or Wavelet codec, just to name a few non-limiting possibilities.

The display unit 120 displays image data output from the image processor 110 and user data output from the controller 130 on a screen. The display unit 120 may comprise, for example, a liquid crystal display (LCD) or other type of thin screen display. In this particular example, the display unit 120 includes an LCD controller, a memory for storing image data, and an LCD display element. When the LCD is implemented using a touch screen technology, the screen of the display unit 120 may function as an input portion.

The controller 130 performs the overall control operation of the portable terminal 100. The controller 130 includes a data processor (not shown) having a transmitter that encodes and modulates a signal being transmitted and a receiver that demodulates and decodes a received signal. The data processor may include a modulator/demodulator (modem) and a codec. The codec includes a data codec for processing data such as packet data and an audio codec for processing audio signals such as voice.

According to the present exemplary embodiment, the controller 130 sets a preview section for a video preview, for which the controller 130 sets at least one of a start point and an end point of the preview section and also sets a default time length thereof. The controller 130 also controls the display unit 120 to display a video preview during a video search. If both a start point and an end point of a preview section are set, the controller 130 may control the display unit 120 to display a video preview thereof from the start point to the end point. If only the start point of the preview section is set, the controller 130 may control the display unit 120 to display a video preview that is played back from the set start point to a point at which the default time length has elapsed. If the end point of the preview section is set, the controller 130 may control the display unit 120 to display a video preview that is played back from a point corresponding to the default time length before the set end point to the set end point. Further, the controller 130 plays back a video when a video is selected according to exemplary embodiments of the present invention.

The memory unit 140 typically includes a program memory for storing programs for controlling the general operations of the portable terminal 100 and a program for managing videos according to exemplary embodiments of the present invention, and a data memory for storing data generated while executing the programs. The memory unit 140 stores at least one video. The memory unit 140 may also store at least one of a start point and an end point of a preview section that is set by the controller 130 and mapped to a corresponding video. The memory unit 140 may store the preview section in the form of a video preview table. The memory unit 140 also stores a default time length that is set by the controller 130.

The audio processor 150 outputs an audio signal received from an audio codec of the data processor of the controller 130 through a speaker SPK, and transmits an audio signal input through a microphone MIC to the audio codec.

Still referring to FIG. 1, the key input unit 160 typically includes numeric and character keys for inputting numeric and character information and function keys for setting various functions. The key input unit 160 further preferably includes shortcut keys for selecting at least one of a start point and an end point of a preview section during playback of a video.

Figure 2:
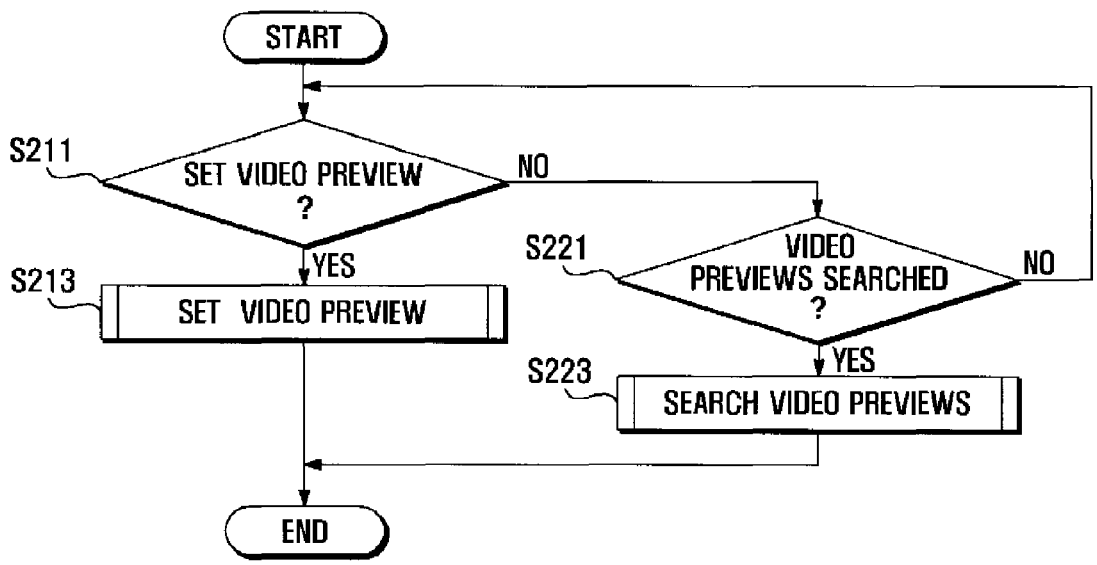
FIG. 2 is a flowchart illustrating a method for managing a video in a portable terminal according to another exemplary embodiment of the present invention.

FIG. 2 is a flowchart illustrating an exemplary method for managing a video in the portable terminal 100 according to another exemplary embodiment of the present invention.

Referring now to FIGS. 1 and 2, if the controller 130 receives a request to set a video preview (S211), the controller 130 performs an operation of setting the video preview (S213). More specifically, the controller 130 sets the various information needed to display the video preview, including a preview section and a default time length. Alternatively, the controller 130 may reset a preset preview section and default time length.

Figure 3:
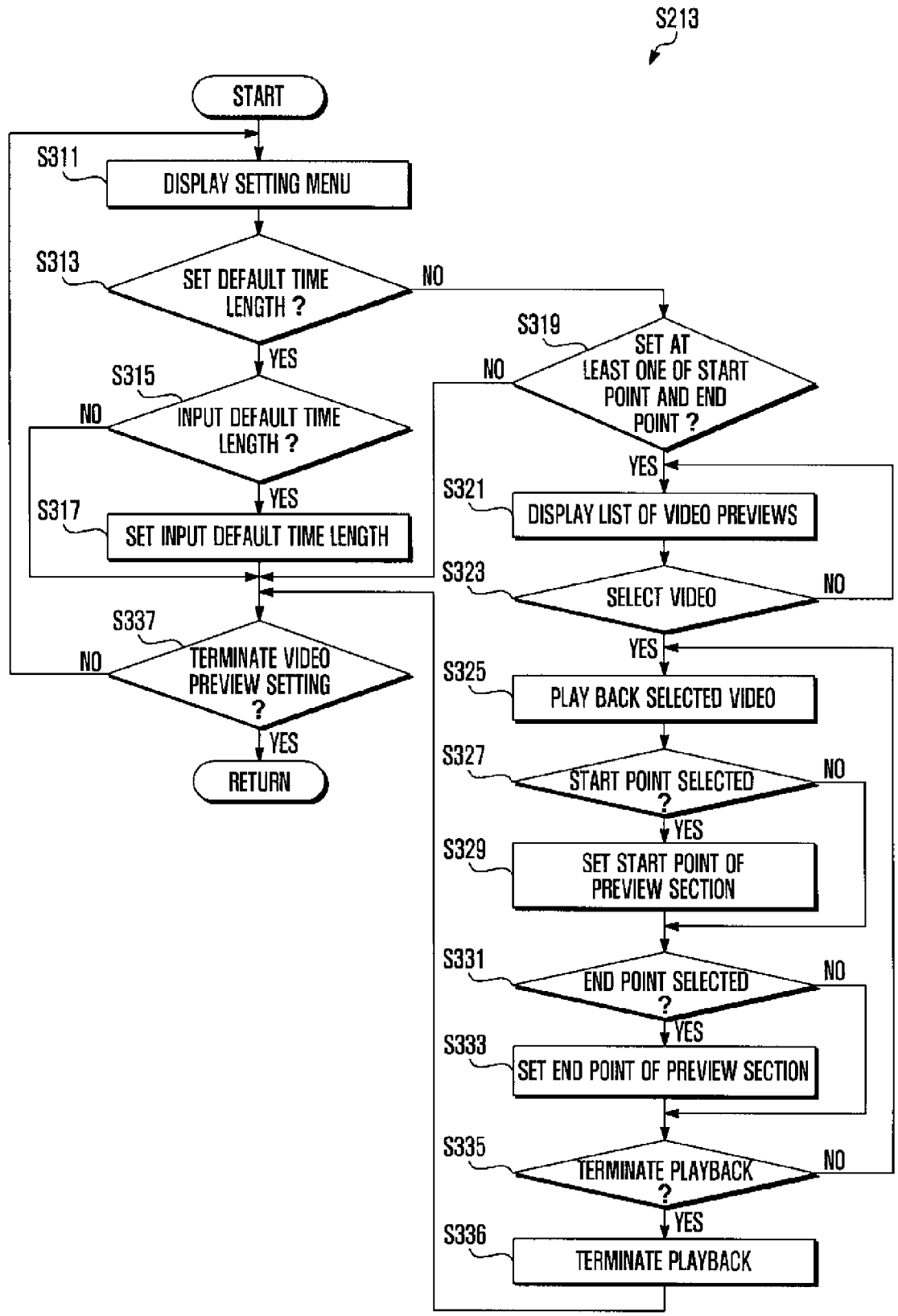
FIG. 3 is a flowchart illustrating an exemplary operation of setting a video preview according to the method of FIG. 2.

FIG. 3 is a flowchart illustrating some exemplary details regarding the operation of setting the video in step S213 according to the flowchart shown in FIG. 2.

Referring to FIGS. 1 and 3, firstly, a setting menu is displayed (S311). More specifically, the controller 130 controls the display unit 120 to display a setting menu containing submenus for setting a default time length of the preview section and for setting at least one of a start point and an end point thereof.

Still referring to FIG. 3, the controller 130 then determines whether the submenu for setting a default time length is selected from the setting menu (S313). If the submenu for setting a default time length is selected, the controller 130 determines whether a default time length is input (S315). If a default time length is input, the controller 130 sets the default time length to the input value (S317).

If the submenu for setting a default time length is not selected at step S313, the controller 130 then determines whether the submenu for setting at least one of a start point and an end point is selected from the setting menu (S319). If the submenu for setting at least one of a start point and an end point is selected, the controller 130 controls the display unit 120 to display a list of at least one video preview stored in the memory unit 140 (S321). In this case, the controller 130 may control the display unit 120 to display a list of video previews for each video. If a video is selected from the list (S323), the controller 130 plays back the selected video (S325). If a start point of the preview section is selected during playback of the video (S327), the controller 130 detects the selection and sets the start point of the preview section to the selected start point (S329). For example, the controller 130 may set the start point of the preview section to a point in the video being played back at which selection of a shortcut key for setting a start point of a preview section is detected. In this case, the controller 130 may identify a frame located at the set start point in the video and control the memory unit 140 to store the identified frame. The controller 130 may also determine the position of the frame identified among all the frames of the video and store in the memory unit 140.

If an end point of the preview section is selected during playback of the video (S331), the controller 130 then detects the selection and sets the end point of the preview section to the selected end point (S333). For example, the controller 130 may set the end point of the preview section to a point in the video being played back at which selection of a shortcut key for setting an end point of a preview section is detected. In this case, the controller 130 may, for example, identify a frame located at the set end point in the video and control the memory unit 140 to store the identified frame. The controller 130 may also determine the position of the frame identified among all the frames of the video and store in the memory unit 140.

Thereafter, the controller 130 determines whether to terminate playback of the video (S335). More specifically, the controller 130 determines whether either playback of the video is completed or a request is made to terminate playback of the video. If playback of the video is to be terminated, the controller 130 terminates play back (S336). If playback of the video is not to be terminated, steps S325 through S335 are repeated until the controller 130 determines that playback of the video is to be terminated. That is, the controller 130 is able to set a plurality of different preview sections for a single video.

As described above, the controller 130 may set at least one of a start point and an end point of a preview section. The controller 130 may also set a plurality of preview sections for each video, which means there can be a plurality of start points or a plurality of end points. In this case, the controller 130 identifies a frame located at a start point in the video for storage in the memory unit 140. The controller 130 also determines the position of the frame identified among all the frames of the video and stores in the memory unit 140. The memory unit 140 is controlled by the controller 130 in this way to store set preview sections in the form of a video preview table as set forth in Table 1:

TABLE 1

| filename | total_frame | start_frame | Start_pos | end_frame | end_pos | No of Extra sect. |
|---|---|---|---|---|---|---|
| AAA | 5123 | 415 | 8.1 | 608 | 11.8 | 0 |
| BBB | 1800 | 0 | 0 | 90 | 5 | 1 |
| BBB | 1800 | 1600 | 88.9 | 1690 | 93.9 | 0 |
| CCC | 3200 | 3002 | 93.8 | 0 | 0 | 0 |
| — | — | — | — | — | — | — |
| — | — | — | — | — | — | — |
| — | — | — | — | — | — | — |

The controller 130 determines whether a request is made to terminate the operation of setting the video preview (S337). If a request is made to terminate the operation of setting the video preview, in response the controller 130 terminates the operation. If no request is made to terminate the operation of setting the video preview, the controller 130 repeatedly performs steps S311 through S337 until a request is made to terminate the operation of setting the video preview.

Now referring back to FIG. 2, if no request to set a video preview is received at step S211, the controller 130 determines whether a request to search video previews is received (S221). If a request to search video previews is received, the controller 130 then performs an operation of searching the video previews (S223). More specifically, the controller 130 controls the display unit 120 to display a video preview containing a preview section that is set for each video. Upon selection of the video preview by the user, the controller 130 plays back a video corresponding to the selected video preview.

Figure 4:
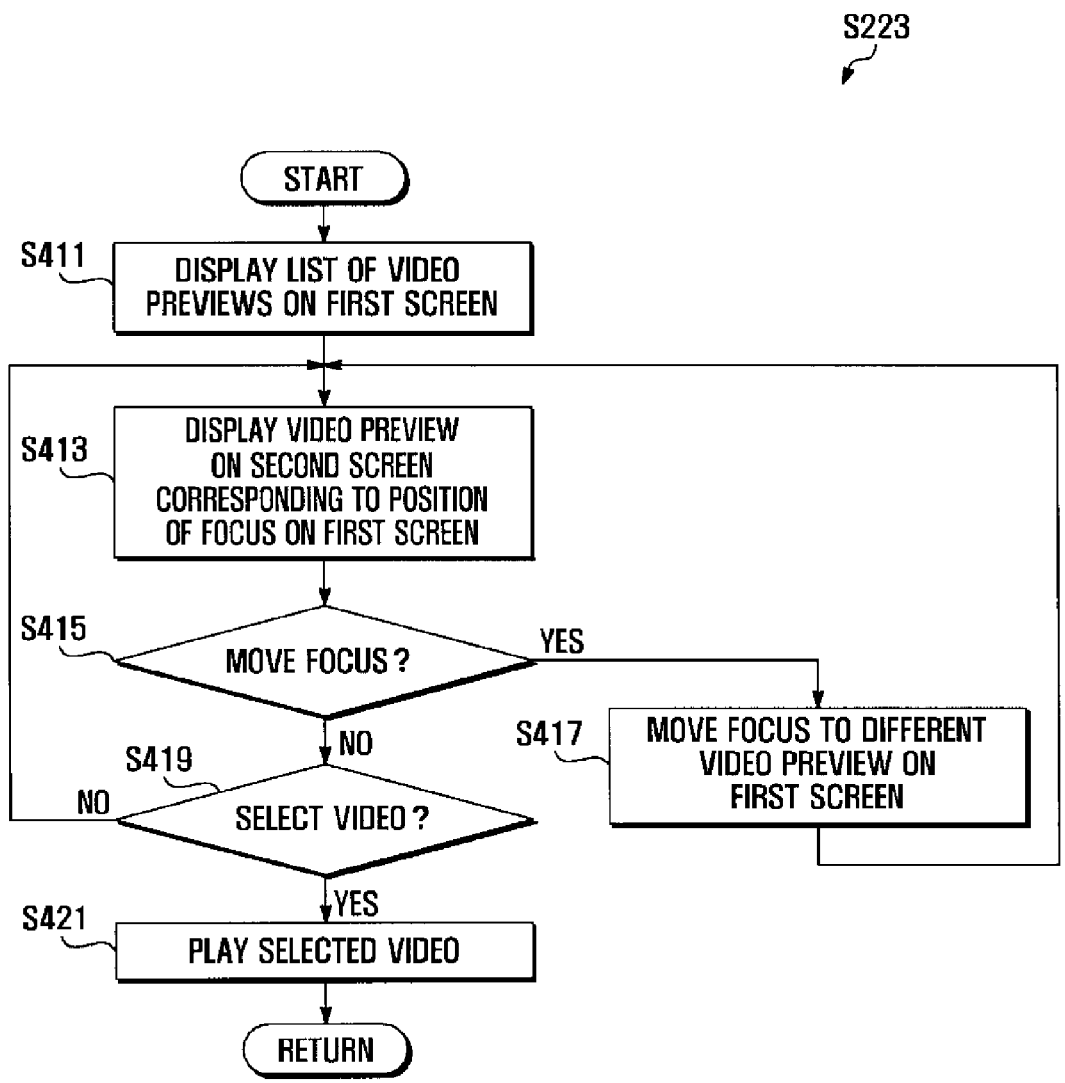
FIG. 4 is a flowchart illustrating an operation of searching for a video using video previews according to the exemplary method of FIG. 2.
Figure 5:
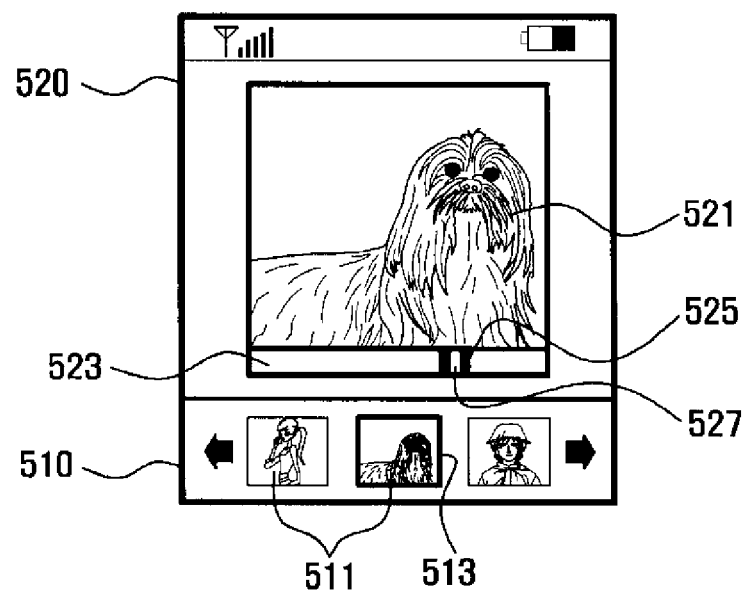
FIG. 5 shows a screen example of a portable terminal performing the operation of searching for a video of FIG. 4.

FIG. 4 is a flowchart illustrating some exemplary details regarding the operation of searching for a video using video previews of step S223 according to the flowchart of FIG. 2. FIG. 5 shows a screen example of a portable terminal performing the operation of searching for a video of FIG. 4.

Referring now to FIGS. 1, 4 and 5, firstly a list of video previews is displayed on a first screen 510 (S411). To achieve this function of displaying the list of video previews, the controller 130 controls the display unit 120 to display thumbnail images 511 that are created from first frames of video previews in a predetermined order. The controller 130 may also position a focus 513 on one of the thumbnail images 511.

Then, the controller 130 typically controls the display unit 120 to display a video preview 521 corresponding to one of the videos on a second screen 520 (S413). It is within the spirit and scope of the invention that the first screen and the second screen may comprise apportioned areas of a single screen. More specifically, the controller 130 controls the display unit 120 to display the video preview 521 for a video corresponding to the thumbnail image 511 located at the position of the focus 513 on the first screen 510. Further, the controller 130 controls the display unit 120 to display a timeline 523 of the video along one side of the video preview 521 with a preview section 525 displayed on the timeline 523 corresponding to the video preview 521. The controller 130 also displays a point 527 within the preview section 525 to indicate a position of a currently displayed frame in the current video preview 521.

For example, if a start point and an end point of a preview section are set for a video, the controller 130 may control the display unit 120 to display the video preview 521 by playing back from the start point to the end point.

If only a start point of a preview section is set for a video (and no end point), the controller 130 may control the display unit 120 to display the video preview by playing back from the set start point to a point at which a default time length has elapsed. If only an end point of a preview section is set for a video, the controller 130 may control the display unit 120 to display the video preview by playing back from a point corresponding to the default time length before the set end point to the set end point. If neither a start point nor an end point of a preview section is set for a video, the controller 130 may control the display unit 120 to display the video preview by playing back from a first frame of the preview section to a point at which the default time length has elapsed.

Still referring to FIGS. 1, 4 and 5, if a request to move the focus 513 is received while displaying the video preview 521 (S415), the controller 130 moves the focus 513 to a selected position on the first screen 510 (S417), and the process returns to step S413 to display the video preview 521 corresponding to the selected position. If no request to move the focus 513 is received at step S415, the controller 130 determines whether a video is selected by the user during display of the video preview 521 (S419). If a video is selected by the user, the controller 130 then plays back the selected video (S421).

In the screen example of FIG. 5 described above, the portable terminal 100 typically displays a list of thumbnail images that are created from the first or initial frames of video previews during a video search, and then displays a video preview corresponding to a selected one of the thumbnail images. In another screen example described in more detail below, the portable terminal 100 may also display a list of video previews during the video search.

Figure 6:
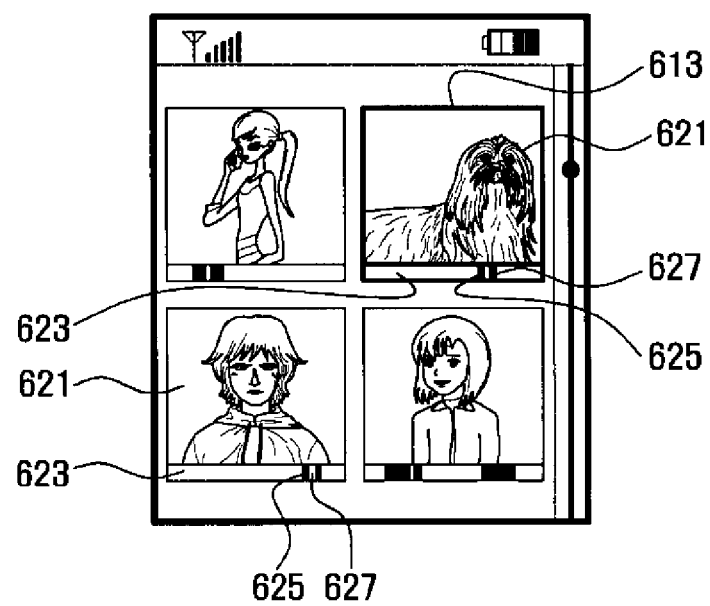
FIG. 6 shows another screen example of a portable terminal performing the exemplary operation of searching for a video of FIG. 4.

FIG. 6 shows another screen example of a portable terminal performing the operation of searching for a video in the example of FIG. 4.

Referring to FIG. 6, the portable terminal 100 displays a list of video previews 621 arranged in a predetermined order. That is, the portable terminal 100 plays back a selected one of the video previews 621 corresponding to a preview section individually set for the corresponding video. In this case, the portable terminal 100 may position a focus 613 on a specific one of the video previews 621. The portable terminal 100 may display a timeline 623 of the video along one side of each of the video previews 621, with a preview section 625 displayed on the timeline 623 corresponding to the video preview 621. The portable terminal 100 also displays a point 627 within the preview section 625 to indicate the position of a currently displayed frame in the video preview 621. Thereafter, upon selecting a specific one from the list of video previews 621, the portable terminal 100 plays back the selected video preview 621.

While it is described above that a portable terminal according to the present invention preferably sets a default time length and at least one of a start point and an end point of a preview section when setting a video preview, and displays a video preview using two of the set default time length, start point and end point when searching video previews, the portable terminal may set a video preview and search video previews in other ways that are within the spirit of invention and the scope of the appended claims. For example, when setting a video preview, the portable terminal may set all of a default time length, a start point and an end point of a preview section. When searching video previews, the portable terminal may display a video preview using the set start point and end point. That is, after the default time length and the start point of a preview section are set, the portable terminal may set an end point using the default time length and the start point. Similarly, if the default time length and the end point of a preview section are set, the portable terminal may then set a start point using the default time length and the end point. Also, the set preview section can initially be a default from the video itself for example, the first frame or some other frame could be designated as providing a preview section, which can be changed by the user of the portal terminal to a different frame or duration as desired.

As described above, a portable terminal and a method for managing videos in the portable terminal according to the present invention enable playback a preview of a video corresponding to a set preview section during a video search on the portable terminal. Viewing a video preview instead of the entire video enables a user of the portable terminal to easily search for a desired video. The present invention also eliminates the need for the user to manually select and view videos in order to search for a video that they want to view, thereby increasing the efficiency of managing videos in the portable terminal.

While exemplary embodiments of the present invention have been shown and described in this specification, it will be understood by those skilled in the art that various changes or modifications of the embodiments are possible without departing from the spirit and scope of the invention as defined by the appended claims.

What is claimed is:

1. A method for managing videos stored in a portable terminal, the method comprising:
   (a) playing back a preview of a video corresponding to a preview section associated with at least one video stored entirely in a memory of the portable terminal during a video search, the preview section being set by a controller of the portable terminal in response to a user-setting; and
   (b) playing back, when the preview of the video is selected, a video corresponding to the selected preview of the video, the played back video being one of the at least one video stored entirely in the memory of the portable terminal.

2. The method of claim 1, further comprising setting or resetting, by the controller at least one preview section of one or more preview sections of the video in accordance with a user-setting by:
   setting a start point of the preview section; and
   setting an end point of the preview section.

3. The method of claim 1, wherein setting by a controller of the portable terminal in response to a user-setting at least one preview section of the one or more preview sections of the video stored entirely in the memory of the portable terminal comprises setting a default time length of at least one preview section of the or more preview sections.

4. The method of claim 3, wherein setting at least one preview section of the one or more preview sections of the video further comprises setting at least one start point of the preview section, and wherein in playing back the preview of the video, the preview of the video is played back from the set start point to a point at which the default time length has elapsed.

5. The method of claim 3, wherein setting at least one preview section of the video further comprises setting at least one end point of the preview section; and wherein in playing back the preview of the video, the preview of the video is played back from a point corresponding to the default time length before the set end point to the set end point.

6. A method for managing videos stored in a portable terminal, the method comprising:
   displaying a list of at least one video preview on a first screen during a video search of one or more entire videos stored in a memory of the portable terminal;
   playing back, on a second screen, a preview of a video from the list of at least one video preview corresponding to a previously-set preview section, wherein the previously-set preview section is user settable via a controller of the portable terminal in response to a user-setting; and
   playing back, when the video preview is selected from the list of at least one video preview, a video corresponding to the selected video preview.

7. The method of claim 6, wherein the first screen and second screen comprise apportioned areas of a single screen.

8. The method of claim 6, wherein the list of at least one video is a list of at least one thumbnail image that is created from a first frame of the preview section.

9. The method of claim 6, wherein setting a preview section of the video comprises:
   setting a start point of the preview section; and
   setting an end point of the preview section.

10. The method of claim 6, wherein setting a preview section of the video comprises setting a default time length of the preview section.

11. The method of claim 10, wherein setting a preview section of the video further comprises setting at least one start point of the preview section; and wherein in playing back the preview of the video, the preview of the video is played back from the set start point to a point at which the default time length has elapsed.

12. The method of claim 10, wherein setting a preview section of the video further comprises setting at least one end point of the preview section; and wherein in playing back the preview of the video, the preview of the video is played back from a point corresponding to the default time length before the set end point to the set end point.

13. A portable terminal for performing a function of managing videos, comprising:
- a memory for storing at least one entire video in the portable terminal having a set preview section and a preview thereof;
- a controller for setting the preview section in response to a user-setting, for playing back a preview of entire video corresponding to a preview section during a video search, and for playing back, when the video having the set preview section is selected, the selected video; and
- a display unit for displaying, under control of the controller, the preview of the video and the video being played back.

14. The terminal of claim 13, wherein the controller of the portable terminal sets a preview section of a plurality of preview sections of the video and the memory stores a preview table containing the plurality of preview sections.

15. The terminal of claim 14, wherein the controller of the portable terminal sets a start point and an end point of the preview section and controls the memory to store the start point and the end point of the preview section.

16. The terminal of claim 14, wherein the controller of the portable terminal sets a default time length of the preview section and controls the memory to store the default time length.

17. The terminal of claim 16, wherein the controller of the portable terminal sets a start point of the preview section, stores the start point in the memory and plays back the preview of the video from the set start point to a point at which the default time length has elapsed.

18. The terminal of claim 16, wherein the controller of the portable terminal sets an end point of the preview section, stores the end point in the memory, and plays back the preview of the video from a point corresponding to the default time length before the set end point to the set end point.

19. The terminal of claim 13, wherein the display unit comprises a first screen for displaying a list of the at least one entire video stored in the memory of the portable terminal, and a second screen for displaying the preview of a video from the list of at least one video corresponding to the set preview section.

20. The terminal of claim 19, wherein the first screen and second screen comprise apportioned areas of a single screen.

* * * * *